Patented Sept. 12, 1944

2,357,838

UNITED STATES PATENT OFFICE 2,357,838

PREPARATION OF A SUGAR

James Cyril Mahoney, Manila, P. I.

No Drawing. Application December 26, 1940,
Serial No. 371,794

6 Claims. (Cl. 127—58)

The invention relates to a process for the separation of a sugar. More particularly, it pertains to a process for the preparation of dextrose and of levulose, and includes correlated improvements and discoveries whereby the production thereof may be enhanced.

An object of the invention is the provision of a procedure in accordance with which a sugar may be obtained in crystalline form, and in a condition of high purity.

Another object of the invention is to provide a process in which a sugar may be separated from a concentrated solution or syrup by treatment with an alcohol and under the influence of agitation.

A further object of the invention is to provide a process whereby the production of sugars may be facilitated and in a manner that may be carried out readily, effectively and economically.

A particular object of the invention is the provision of a process for the preparation of dextrose and of levulose in crystalline form from a solution containing these sugars. The sugars obtained are substantially free from other substances and crystallization is occasioned in a relatively short time, such procedure entailing vigorous incorporation of alcohol into a concentrated solution of the sugars, and then permitting crystallization to take place.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention production of sugars may be attained by preparing a concentrated solution containing a preponderant amount of a sugar, as a concentrated solution or syrup having a Brix of at least 92°, adding an alcohol thereto, stirring vigorously, and then allowing the sugar to crystallize. The alcohol added preferably is ethyl alcohol but other of the lower aliphatic alcohols may be employed, as methyl, propyl, butyl and amyl alcohols, and the concentration thereof desirably should be at least 90%, specifically about 96%. Also, the addition of alcohol may suitably be in an amount such as to give a concentration of the alcohol in the reaction mass of about 60% by volume. A satisfactory separation of sugar depends upon the vigorous agitation or stirring, since otherwise there is a tendency for the mass to coalesce, which renders separation difficult and highly impractical. The stirring, hence, should be at a rate of at least 200 R. P. M., and more particularly at least 300 R. P. M. Higher rates may be employed with the provision of equipment capable of effecting thorough stirring at a relatively high rate.

Production of dextrose and levulose may be accomplished by inverting cane sugar or sucrose in a suitable and proper manner with obtention of an invert sugar syrup. This is desirably concentrated to a relatively high Brix, such as at least 92°. The concentration might be carried to as high a Brix as will permit ready working of the concentrated solution, which desirably is carried out by cooling, but only to such a temperature as retains the mass in a fluid state. When cooling has been so effected an alcohol, as ethyl alcohol, is added thereto, and the mass stirred vigorously, as by means of a high speed stirrer rotating at or over 300 R. P. M.

It has been found that a stirrer having a marine type of propeller is well adapted to effect incorporation and distribution of the alcohol, and the mash should be thoroughly stirred either continuously or at frequent intervals for short periods. The mass is now permitted to stand with the sugar, i. e., dextrose, crystallizing out, and when the conditions have been fulfilled properly this wil take place within six to twelve hours or less. The dextrose crystals may now be separated from the mother liquor in a suitable manner, as by filtering or centrifuging, and the mother liquor will consist of a solution containing the levulose and added alcohol. In order to remove or separate the alcohol therefrom the mother liquor is distilled and the levulose syrup produced concentrated to a high Brix, preferably over 92°, and especially about 96°. At this point the pH value of the syrup should be about 3.4, and if it is found to be otherwise it may be rectified by the addition of an inorganic acid, for example, hydrochloric acid. Following this an alcohol may be added to the concentrated syrup under vigorous stirring and other conditions attending the separation of dextrose, resulting in separation of levulose in crystalline form. Crystallization of the levulose may be completed within a period of two hours or less in the event that the syrup is of high purity. The dextrose and levulose, following separation from mother liquor in crystalline form, may be dried, and the solution containing alcohol distilled in order to recover the alcohol which may be utilized for the treatment of further quantities of concentrated sugar solutions.

If desired, the procedure may be conducted in a manner to yield dextrose and levulose of high purity and in crystalline form, and in addition a syrup containing dextrose and levulose which is suitable for table use. This may be occasioned by concentrating an invert sugar solution to a high density or Brix, and then incorporating alcohol under vigorous stirring. When a sufficient quantity of dextrose has been separated in crystallized form, it is removed and the syrup containing dextrose, levulose and alcohol cooled. To this syrup lime may be added with the formation of calcium levulosate, which is removed by vacuum filtration, the filtrate treated to precipitate the lime, the alcohol distilled off and recovered, and the sugar containing solution concentrated to a syrup consistency.

As an illustrative embodiment of a manner in which the process may be practiced, especially for the production of dextrose and levulose from an invert sugar solution, the following description is presented. A solution of sucrose may be fully inverted by means of hydrochloric acid, and retained slightly on the acid side, i. e., having a pH value of about 3.4, following neutralization of the acid. The invert sugar solution so obtained may be concentrated, as under vacuum, to around 92° to 94° Brix, and while warm and before setting ethyl alcohol having a concentration of about 96% may be added. The reaction mass is now subjected to vigorous stirring so that the alcohol becomes thoroughly incorporated into the sugar syrup, and to effect this a stirrer provided with a marine type of propeller has been found to give satisfactory results at a rate of at least 200 R. P. M. desirably from 250 to 300 R. P. M. and higher. It is of import that the alcohol and concentrated sugar solution or syrup be well intermixed inasmuch as thereby the separation of dextrose through crystallization when the mass is permitted to stand is augmented. If desired seed crystals of dextrose may be added since these tend to hasten the crystallization which usually entails a period of a few hours.

When the dextrose has crystallized it may be separated from mother liquor containing levulose by centrifuging or by filtration, and the filtrate which is a high purity levulose may be distilled to recover the alcohol. This alcohol may be utilized for the processing of other quantities of sugar syrup. Following removal of alcohol from the levulose syrup it may be concentrated to a Brix of about 94° and alcohol added thereto under vigorous stirring, as in the production of dextrose. Seeding of the mass with levulose crystals may attend, and crystallization of the levulose effected within a period of about two hours. An adjustment of the pH value of the filtrate after separation of dextrose crystals may be made if it is found that it is other than about 3.4. Such adjustment may be brought about by introduction of hydrochloric acid in required amount. Not only may sugars be separated one from another in the foregoing manner and depending upon their solubility in an alcohol medium, but a refinement of a given sugar may also be accomplished. Thus, dextrose may be refined by melting the sugar, filtering through carbon and concentration to a Brix of about 93 to 94°. To the concentrated mass alcohol may be added together with a small amount of dextrose crystals as seed and under the influence of vigorous stirring. The dextrose crystallizes in about four hours, and is then separated and dried.

I have observed that when the concentrated sugar solution has been thoroughly stirred with the alcohol, it does not become hard, but unless it is so treated the sugar does not crystallize well and hence cannot be readily separated or freed from mother liquor. When the procedure has been properly conducted there will not be a clinging of the syrup to the sides of the container and the dextrose will filter rapidly, giving a clear filtrate. Otherwise, however, it will be difficult to remove the dextrose by filtration and the filtrate resulting will be decidedly cloudy. When the filtrate is rich in levulose this sugar may be obtained therefrom simply by distilling off the alcohol, concentrating to a high Brix, adding alcohol and stirring vigorously. Levulose will then crystallize out, as a free-flowing mass, which may be aided through seeding. The procedure is also adapted for the preparation of levulose from inulin contained in certain tubers and other plants, as the Jerusalem artichoke. In this procedure the inulin is first extracted from the tuber or plant, as by expression and then hydrolyzed by means of an acid, such as hydrochloric acid. This may be followed by neutralization with calcium or other suitable carbonate whereupon the liquor is filtered, the pH value adjusted to about 3.4, concentrated under vacuum to about 94° Brix, and crystallization brought about by addition of alcohol under vigorous stirring, followed by permitting the mass to stand, whereupon levulose in crystalline form separates. The levulose crystals may then be removed and dried in a suitable manner.

The foregoing procedure may be applied with especial advantage in the production of dextrose and levulose from cane sugar through an inversion thereof and also for making therefrom levulose in crystalline form, or a syrup which is rich in the levulose. There may be obtained also as a resultant product a syrup containing levulose and dextrose, or, depending upon the extent of the inversion, a syrup containing sucrose, levulose, dextrose and invert sugar. Consequently, there may be produced dextrose and levulose in crystalline form and of high purity and, if desired, a residual syrup containing these sugars.

An advantageous conducting of the process is attended by having a full inversion of sucrose. The inversion may be occasioned by means of a usual method providing the invert sugar solution is maintained free from substances which deleteriously affect the crystallization. Further, if the sucrose is not fully inverted the filtrate from removal of crystalline dextrose will be such as to yield a levulose syrup of lower purity. Moreover, it is desirable that the invert sugar solution or syrup be freshly prepared. A levulose syrup of high purity yields a heavy massecuite when concentrated and alcohol has been incorporated therewith. Generally, the procedure may be used for the separation of sugars which are soluble in alcohol from sugars or substances which are insoluble therein, and it may be utilized not only for the separation of sugars from one another but for the crystallization in a rapid manner of sugars in a refinement or purification thereof. Thus, dextrose may be separated rapidly from an invert sugar solution as the crystallized sugar and levulose may also be separated from an invert sugar solution in crystalline form. These sugars, as also maltose, may be obtained within a short period of time in crystallized condition from solutions of the respective sugars. Mixing or stirring vigorously may be occasioned at a rate which may be 300 R. P. M. or higher, and in the event that the intermixing with the alcohol is not thorough the result will be in the nature of an emulsion rather than a solution. It is believed that the vigorous incorporation of alcohol with the concentrated solution or syrup leads to the levulose being taken up by the alcohol in solution, whereas the dextrose is held in suspension by the alcohol but separated from the levulose, and consequently it is in a pure state and free to crystallize out. Accordingly, the alcohol appears to act as a repellent to the dextrose, thus keeping the two sugars separate.

Furthermore, an edible molasses may be produced from blackstrap or other Central molasses, leading to a product giving better alcohol recovery because of better fermentation through incorporating an alcohol with the molasses under the influence of vigorous agitation or stirring. The molasses, such as cane or beet molasses, sorghum or plain molasses may be admixed intimately with the alcohol in suitable proportions, usually equal quantities of molasses and alcohol, through agitation by means of a high speed mixer. The mixture of molasses and alcohol may then be passed through a centrifugal separator which removes the impurities, giving as a run off a clarified and purified molasses-alcohol solution. The separated impurities may be utilized as a binder in the manufacture of briquettes from bagasse, sawdust and other substances having fuel value, or the separated substances may be dried and used directly for fuel. When they are so utilized the ash may be recovered and use made thereof as a fertilizer or for recovery of its constituents, as potash, phosphates and other salts. Additionally, the separated mass of impurities may be subjected to destructive distillation with recovery of products.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the production of dextrose and levulose, which comprises preparing a concentrated solution containing dextrose and levulose having a sugar content of at least 92° Brix, adding a lower aliphatic alcohol thereto in an amount to give about 60% alcohol by volume, subjecting to the influence of vigorous mechanical stirring throughout at a rate of at least 200 R. P. M. whereby rapid crystallization of dextrose is induced, allowing dextrose to crystallize, and separating crystallized dextrose from mother liquor containing levulose.

2. A process for the production of dextrose and levulose, which comprises preparing an invert sugar solution having a sugar content of at least 92° Brix, adding ethyl alcohol having a concentration of at least 90% thereto, subjecting to the influence of vigorous mechanical stirring throughout at a rate of at least 200 R. P. M. thereby inducing rapid crystallization of dextrose, allowing dextrose to crystallize, separating crystallized dextrose from mother liquor, removing alcohol from the mother liquor, concentrating said mother liquor, and then in like manner adding ethyl alcohol, stirring vigorously, and permitting levulose to crystallize.

3. A process for the treatment of a sugar-containing material, which comprises preparing a solution of a sugar of about 92° Brix, incorporating a lower aliphatic alcohol having a concentration of at least 90% therewith under the influence of vigorous mechanical stirring throughout at a rate of at least 200 R. P. M. thereby inducing rapid separation of contained substances, allowing contained substances to separate, and removing thus separated substances from the solution.

4. A process for the production of a sugar, which comprises preparing a concentrated solution of a sugar belonging to the group consisting of dextrose and levulose having a Brix of at least 92°, adding a lower aliphatic alcohol thereto, then subjecting to the influence of vigorous mechanical stirring throughout at a rate of at least 200 R. P. M. whereby rapid crystallization of sugar is induced, allowing sugar to crystallize, and separating crystallized sugar from mother liquor.

5. A process for the production of a sugar, which comprises preparing a concentrated solution of a sugar belonging to the group consisting of dextrose and levulose having a Brix of at least 92°, adjusting the pH value of the solution to about 3.4, adding ethyl alcohol thereto having a concentration of at least 90%, then subjecting to the influence of vigorous mechanical stirring throughout at a rate of at least 200 R. P. M. whereby rapid crystallization of sugar is induced, allowing sugar to crystallize, and separating crystallized sugar from mother liquor.

6. A process for production of a sugar, which comprises preparing a concentrated solution of a sugar belonging to the group consisting of dextrose and levulose having a Brix of at least 92°, adding a lower aliphatic alcohol thereto having a concentration of at least 90%, subjecting to the influence of vigorous mechanical stirring throughout at a rate of at least 200 R. P. M. whereby rapid crystallization of sugar is induced, allowing sugar to crystallize, separating crystallized sugar from mother liquor, and treating thus obtained mother liquor in like manner with alcohol and vigorous stirring for further production of sugar.

JAMES CYRIL MAHONEY.